United States Patent
Eberhardt et al.

(10) Patent No.: US 6,677,560 B2
(45) Date of Patent: Jan. 13, 2004

(54) APPARATUS FOR INDUCTIVELY HEATING A WORKPIECE

(75) Inventors: Helmut Eberhardt, Gründau (DE); Karl-Heinz Grosse, Gründau (DE); Karl Herchenröther, Birstein (DE); Jürgen Lemke, Weinheim (DE)

(73) Assignee: Ald Vacuum Technologies AG, Hanau (DE)

( * ) Notice: Subject to any disclaimer, the term of this patent is extended or adjusted under 35 U.S.C. 154(b) by 308 days.

(21) Appl. No.: 09/778,160

(22) Filed: Feb. 6, 2001

(65) Prior Publication Data

US 2001/0045426 A1 Nov. 29, 2001

(30) Foreign Application Priority Data

Feb. 19, 2000 (DE) .......................... 100 07 757

(51) Int. Cl.[7] ................................. H05B 6/10
(52) U.S. Cl. .................. 219/635; 219/634; 219/647; 219/656; 219/661; 219/674
(58) Field of Search ................. 219/634, 635, 219/639, 640, 656, 647, 660, 661, 672, 674

(56) References Cited

U.S. PATENT DOCUMENTS

| | | | | |
|---|---|---|---|---|
| 2,182,820 A | * | 12/1939 | Pisarev | 219/672 |
| 4,093,839 A | * | 6/1978 | Moliterno | 219/658 |
| 4,325,777 A | * | 4/1982 | Yarwood et al. | 156/620 |
| 4,488,507 A | * | 12/1984 | Jackson, Jr. | 219/634 |
| 4,755,648 A | * | 7/1988 | Sawa | 219/661 |
| 4,812,052 A | * | 3/1989 | Adam et al. | 219/634 |
| 5,428,208 A | * | 6/1995 | Chatterjee et al. | 219/635 |
| 5,993,058 A | | 11/1999 | Rochard et al. | |

FOREIGN PATENT DOCUMENTS

| | | |
|---|---|---|
| DE | 1 941 254 | 7/1970 |
| EP | 0 094 759 | 11/1983 |

OTHER PUBLICATIONS

Meyers Enzyklopadisches Lexikon and English trnaslation of Inductive Heating, 1974, vol. 12. p. 566.
JP 0062297453 (In Patent Abstracts of Japan, 1987).

* cited by examiner

Primary Examiner—Philip H. Leung
(74) Attorney, Agent, or Firm—Fulbright & Jaworski L.L.P.

(57) ABSTRACT

The invention relates to an apparatus and a method for heating a workpiece of an inductively heatable material, for example a turbine blade. Such a turbine blade consists of a massive blade base and a low-mass blade leaf. To enable the blade base and blade leaf to be heated in a manner appropriate to each an induction coil is provided, which surrounds the blade base and the blade leaf. By suitable choice of the alternating currents which flow through the induction coil and/or through the interposition of a susceptor between turbine blade and induction coil, the blade base and blade leaf can be heated in an appropriate manner.

26 Claims, 10 Drawing Sheets

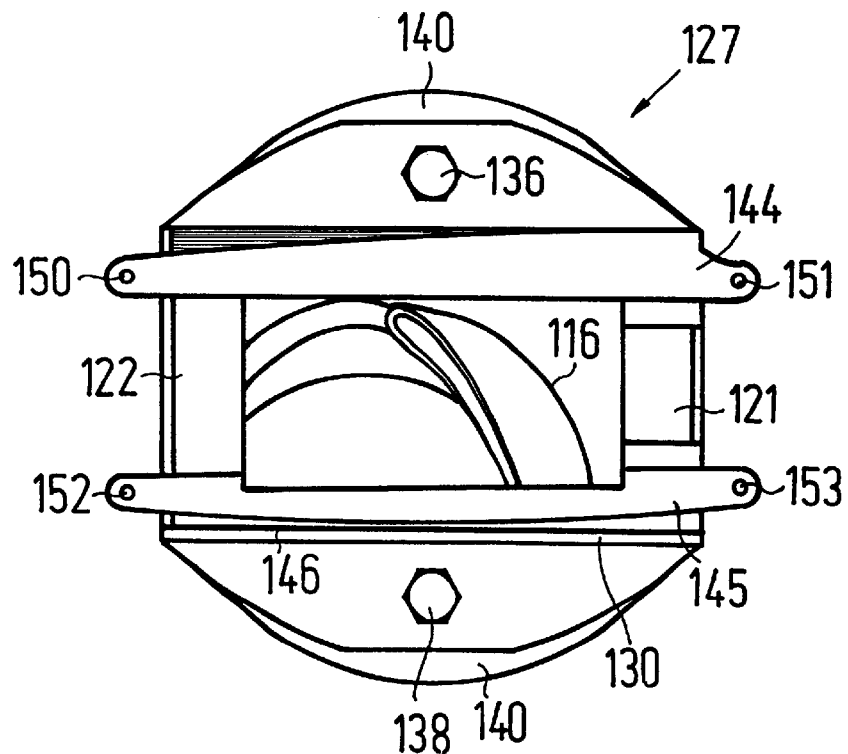
FIG.5 (view „A")
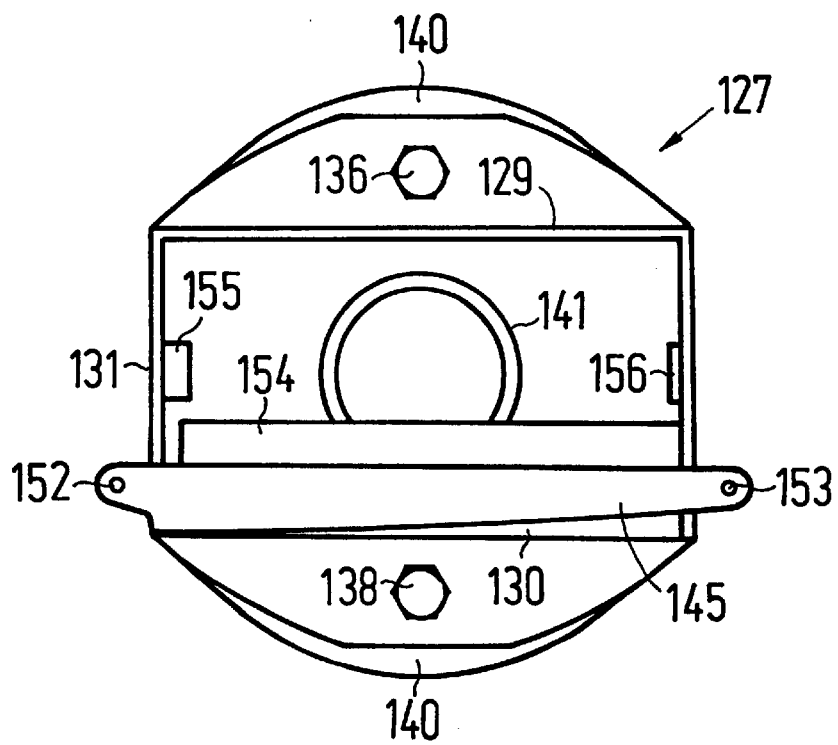
FIG.6 (view „B")

APPARATUS FOR INDUCTIVELY HEATING A WORKPIECE

The invention relates to an apparatus and method for heating a workpiece of an inductively heatable material.

Turbine buckets are often provided with a coating which has special properties; for example, it is extremely hard or serves only for thermal insulation. In order that these coatings, which are applied, for example by EB or PVD or sputtering methods, may be bonded to the surface of the turbine buckets, these turbine buckets must be heated to a specific temperature.

Heating turbine buckets to a specific temperature is problematical especially because a turbine bucket is not a symmetrical or in any way uniform work piece, but has a base of great mass and a blade of low mass. On account of this basic structure of a turbine bucket the uniform heating of all parts of a turbine bucket can be achieved only with difficulty.

It is already known to heat turbine buckets by radiant heating, for example with infrared heaters. However, with radiant heating only a limited power-area ratio can be achieved, with the result that a relatively long time is needed to raise heavy gas turbine buckets, for example, to temperature.

To eliminate this disadvantage, turbine buckets have already been heated by means of electron beams, which lead to a higher power-area ratio and, if an appropriate pattern of movement of the electron beams is selected, they produce uniform heating as well.

In the case of electron beam heating, it is a disadvantage that a complex electron gun with a likewise complex deflection system is required. Moreover, in electron beam heating the energy which leads to the heating of the workpiece can be applied only to the surface of the workpiece. Therefore, due to limited thermal conductivity it takes a relatively long time before the heat has penetrated into the depth of the workpiece.

The heating of materials of good electrical conductivity, especially metals, by means of alternating magnetic fields has long been known in the form of so-called "inductive heating" (Meyers Enzyklopädisches Lexikon, Vol. 12, Hf-Iz, page 566). The material or workpiece is placed inside of an often liquid-cooled working coil through which an alternating current flows. The alternating magnetic field that is formed produces eddy currents in the workpiece and their Joulean heat heats the material.

To preheat the surface of a body for treatment and obtain uniform carburization, it is also known to superimpose an alternating magnetic field on a rotating magnetic field and thus produce induction heating (JP 0062297453 AA).

It is furthermore known to use induction heating to bring the temperature to 3300° C. within 20 seconds (U.S. Pat. No. 5,993,058). In this induction heating a susceptor is used, which is brought into a variable magnetic field which exerts an electromotive force. The induced currents (or eddy currents) which flow through the susceptor are converted to heat. A specimen to be heated is then heated by the radiation of the susceptor.

Lastly, another apparatus and a method for coating metal objects from a metal vapor are known, in which the object is passed through an induction coil in order to preheat a portion of the object's surface to a specific temperature (EP 0 094 759 A2). The preheated portion is then bathed in a stream of metal powder so that the metal powder deposits itself thereon. The object thus treated passes then through a second induction coil which heats it and the metal powder to a certain temperature so that the metal powder fuses with the object.

The invention is therefore addressed to the problem of permitting a rapid heating of workpieces, especially turbine blades, before and/or during a coating process.

The problem is solved by the present invention.

The invention thus relates to an apparatus and a method for heating a workpiece of metal, for example a turbine blade. Such a turbine blade consists of a base of great mass and a low-mass wing. To enable the base and the wing to be heated appropriately, an induction coil is provided which surrounds the base and wing. By the appropriate choice of the frequencies of the alternating currents that flow through the induction coil and/or by the insertion of a susceptor between the turbine blade and the induction coil, the base and wing can be heated in an appropriate manner.

The advantage achieved with the invention consists especially in the fact that the heat does not have to penetrate from the exterior into the workpiece by thermal conduction, but is formed within the workpiece. Thus the heat can be distributed uniformly or non-uniformly through the workpiece, say by varying the pitch of the coil or the coil diameter according to the longitudinal axis of the coil. The heat distribution can also be controlled by various screening around the workpiece or by selecting various frequencies.

Embodiments of the invention are represented in the drawings and are described hereinbelow.

Figure 1:
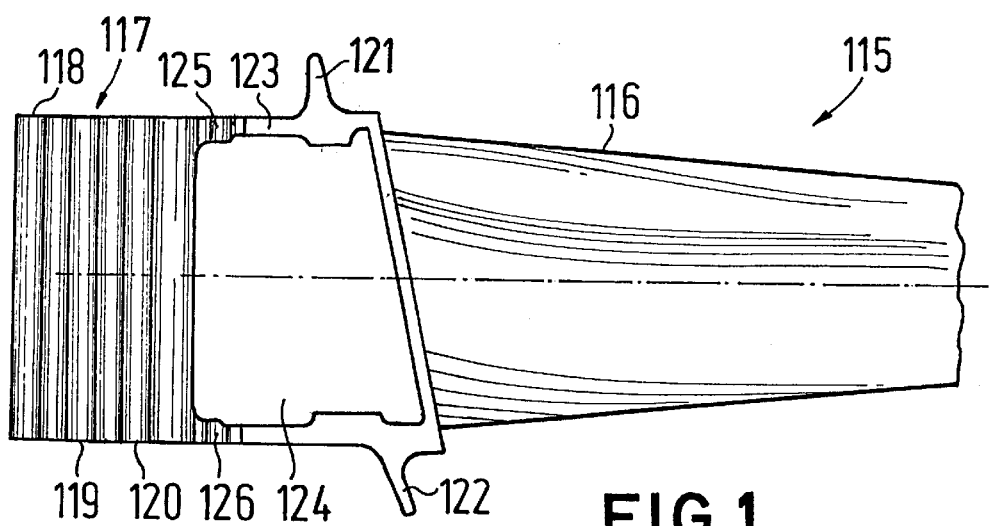
FIG. 1 is a plan view of a portion of a turbine blade that is to be treated.
Figure 2:
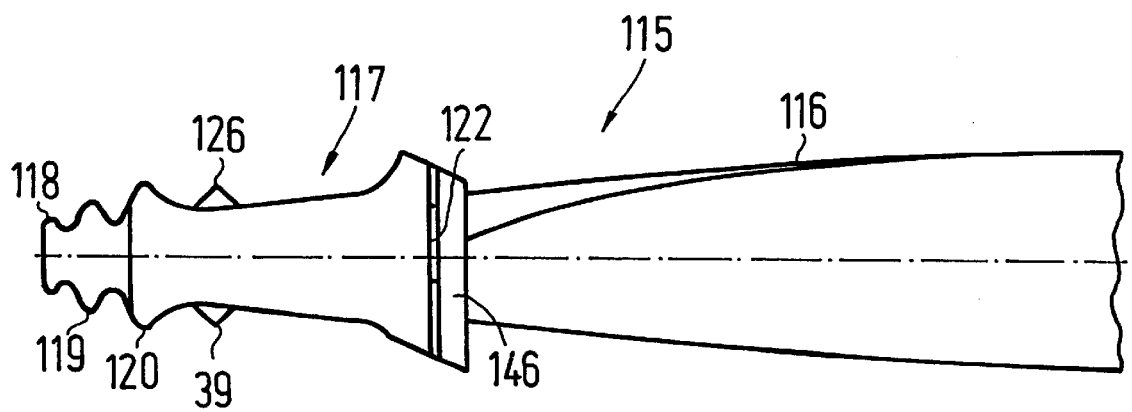
FIG. 2 is a side elevation of the portion of the turbine blade represented in FIG. 1.
Figure 3:
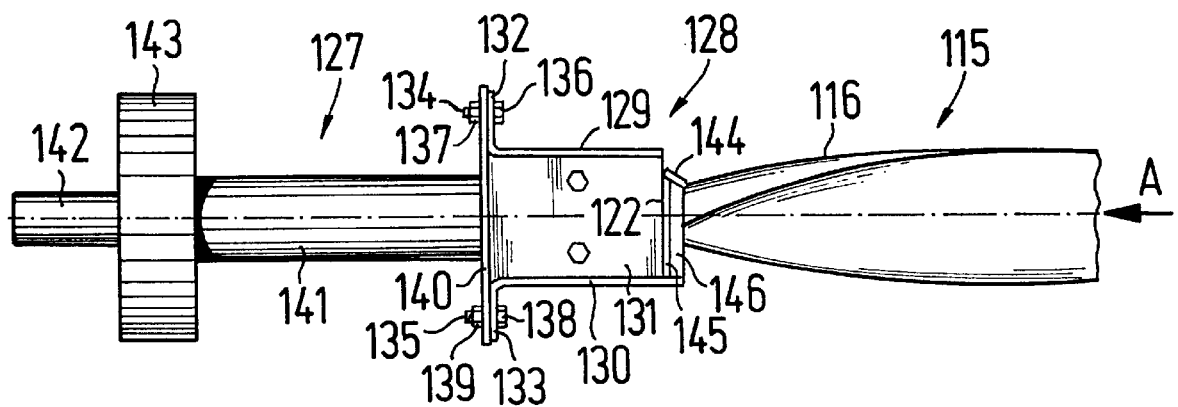
Figure 4:
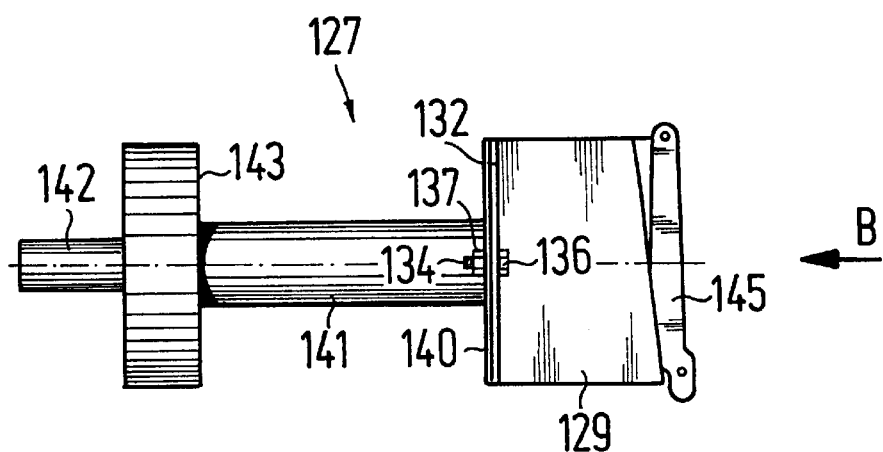
Figure 7:
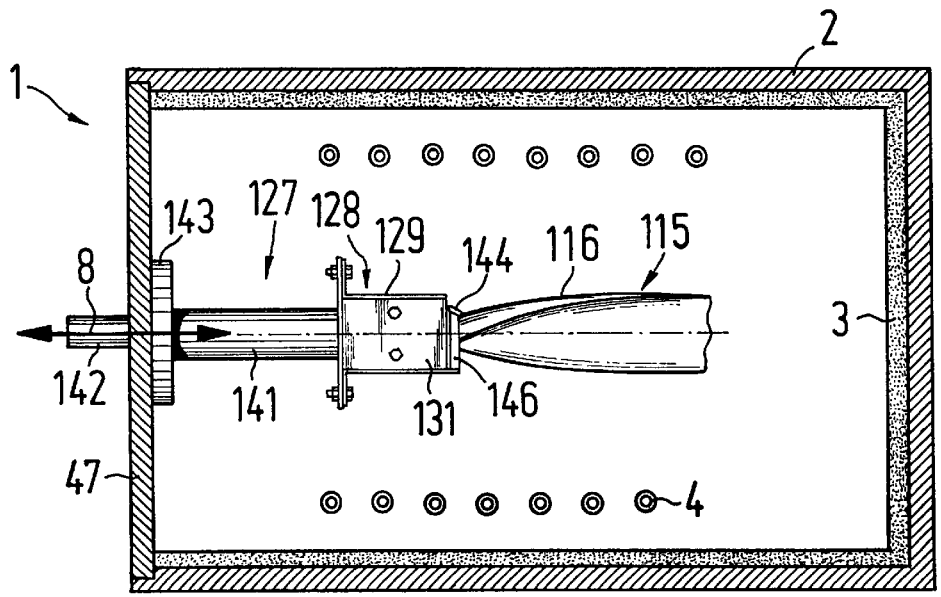
Figure 8:
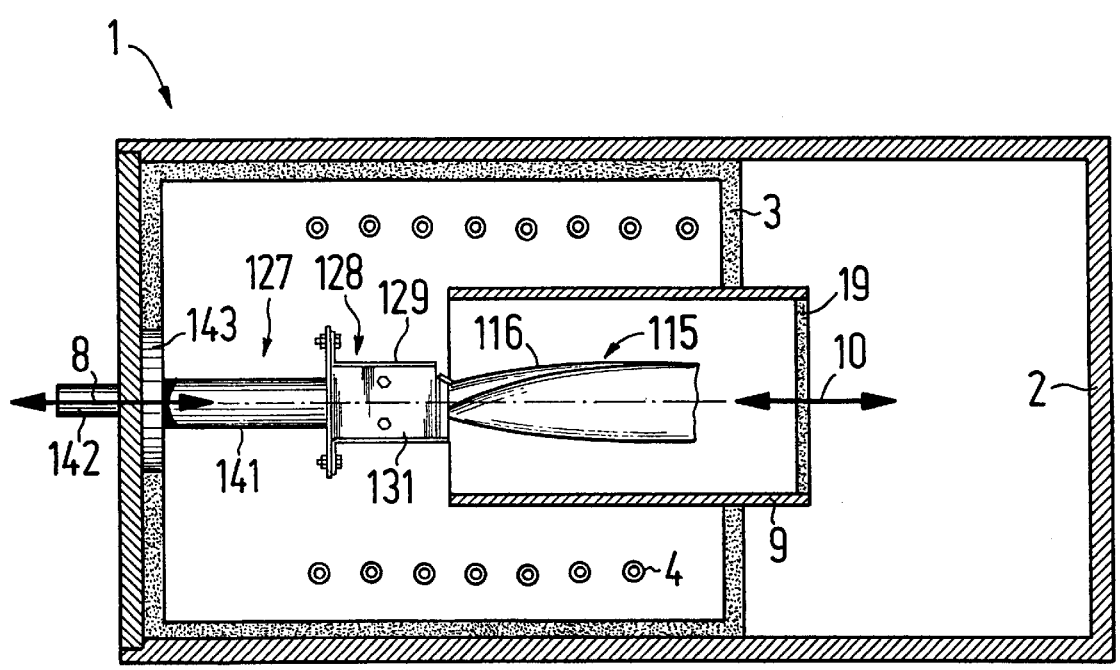
Figure 9:
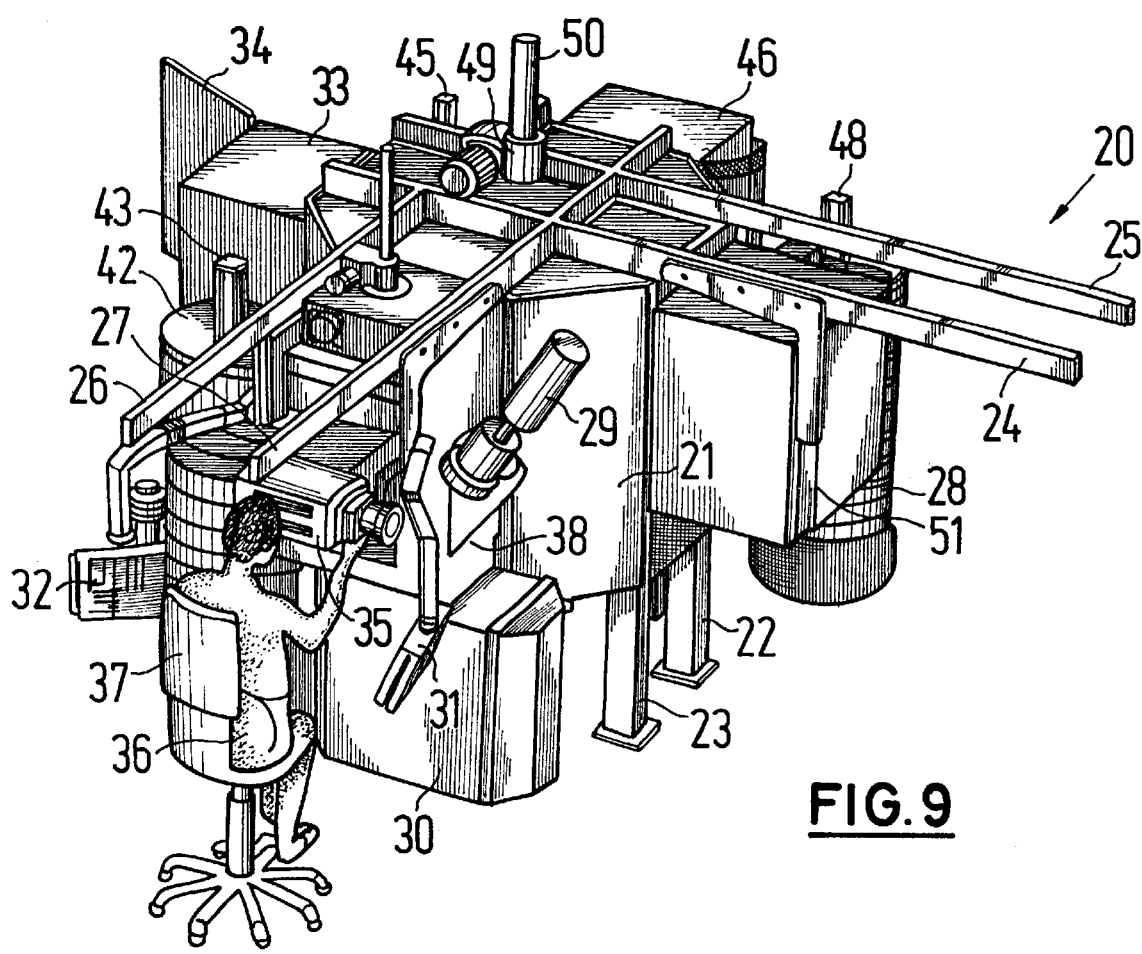
Figure 10:
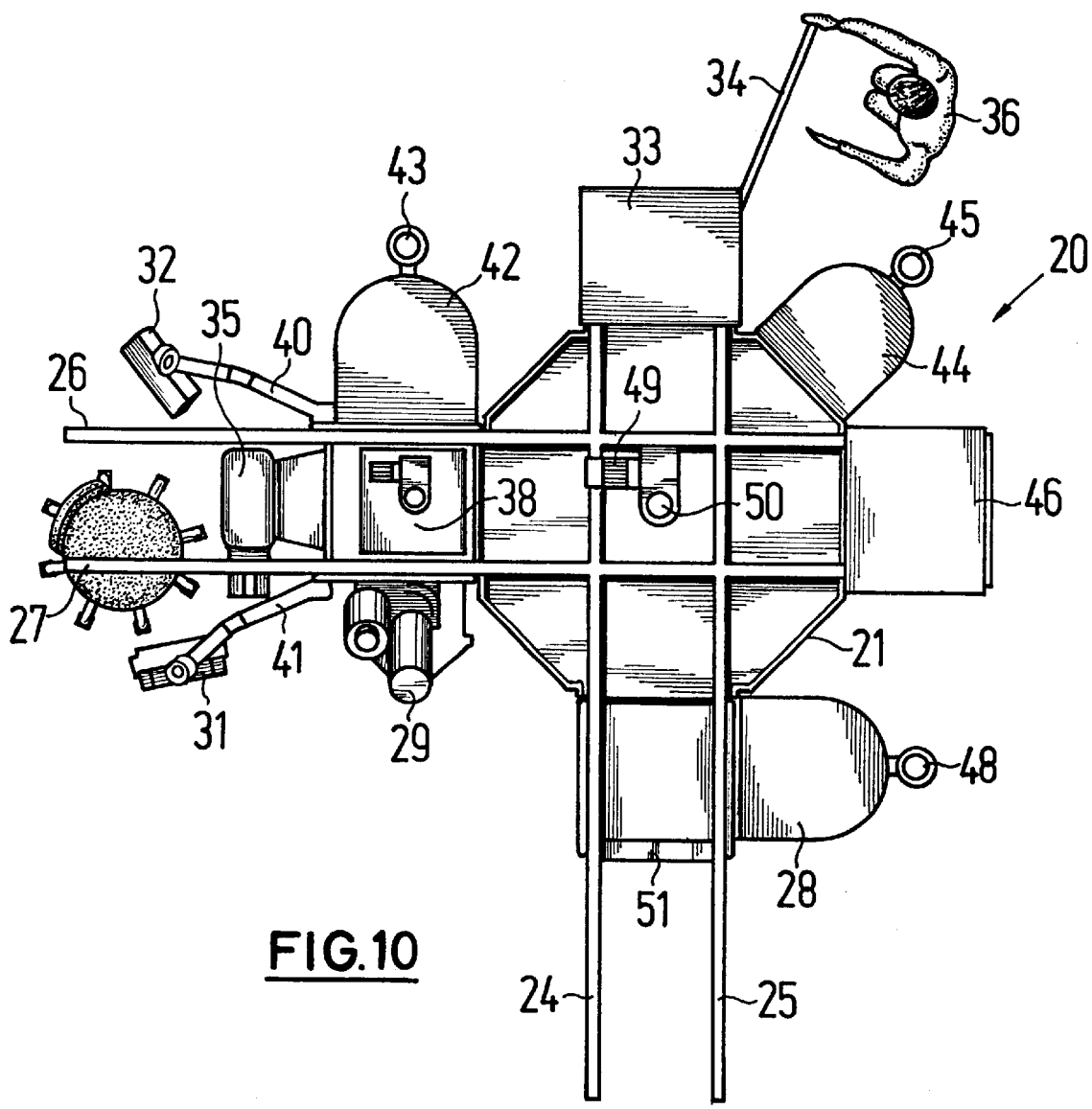
Figure 11:
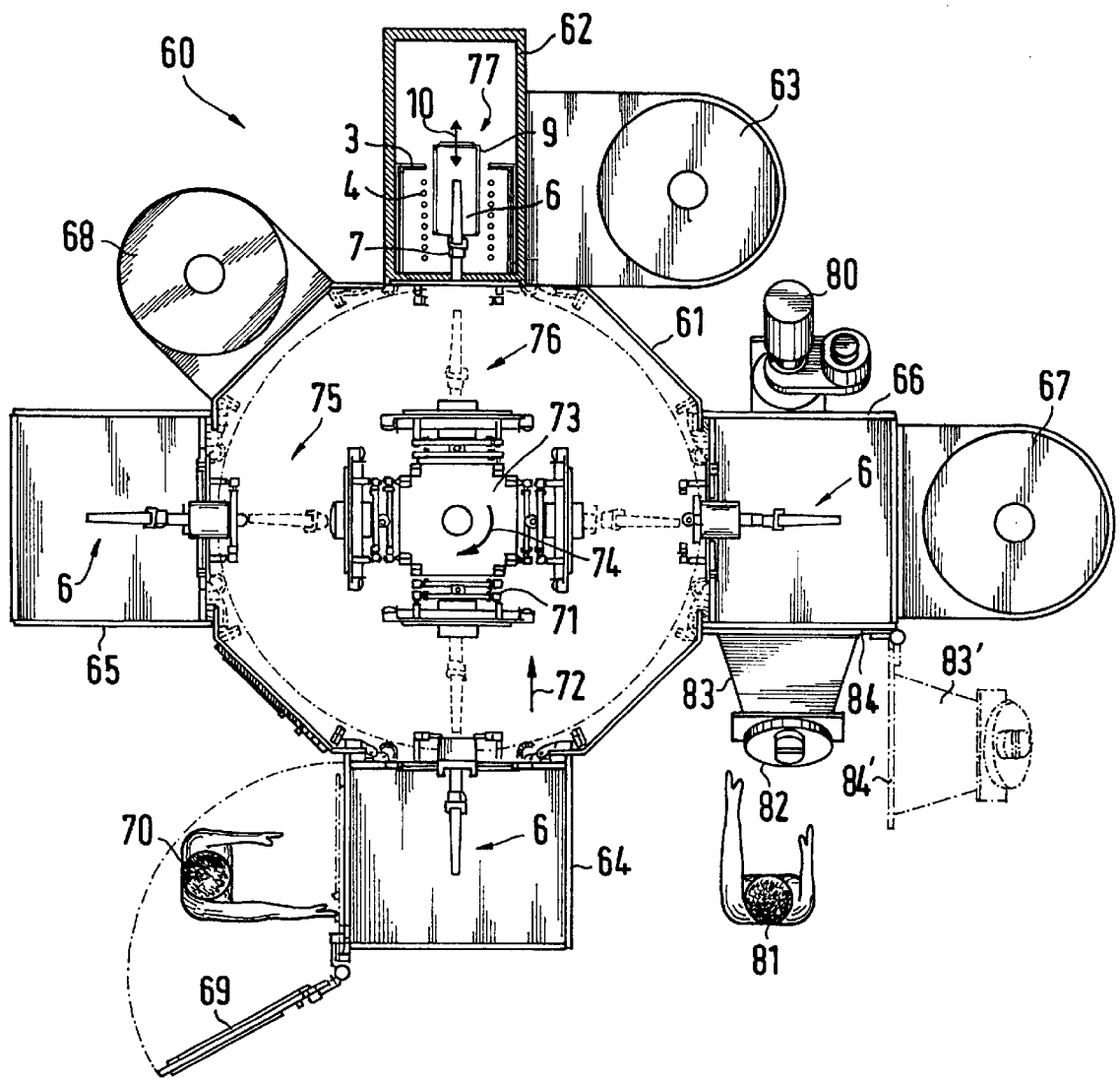
Figure 12:
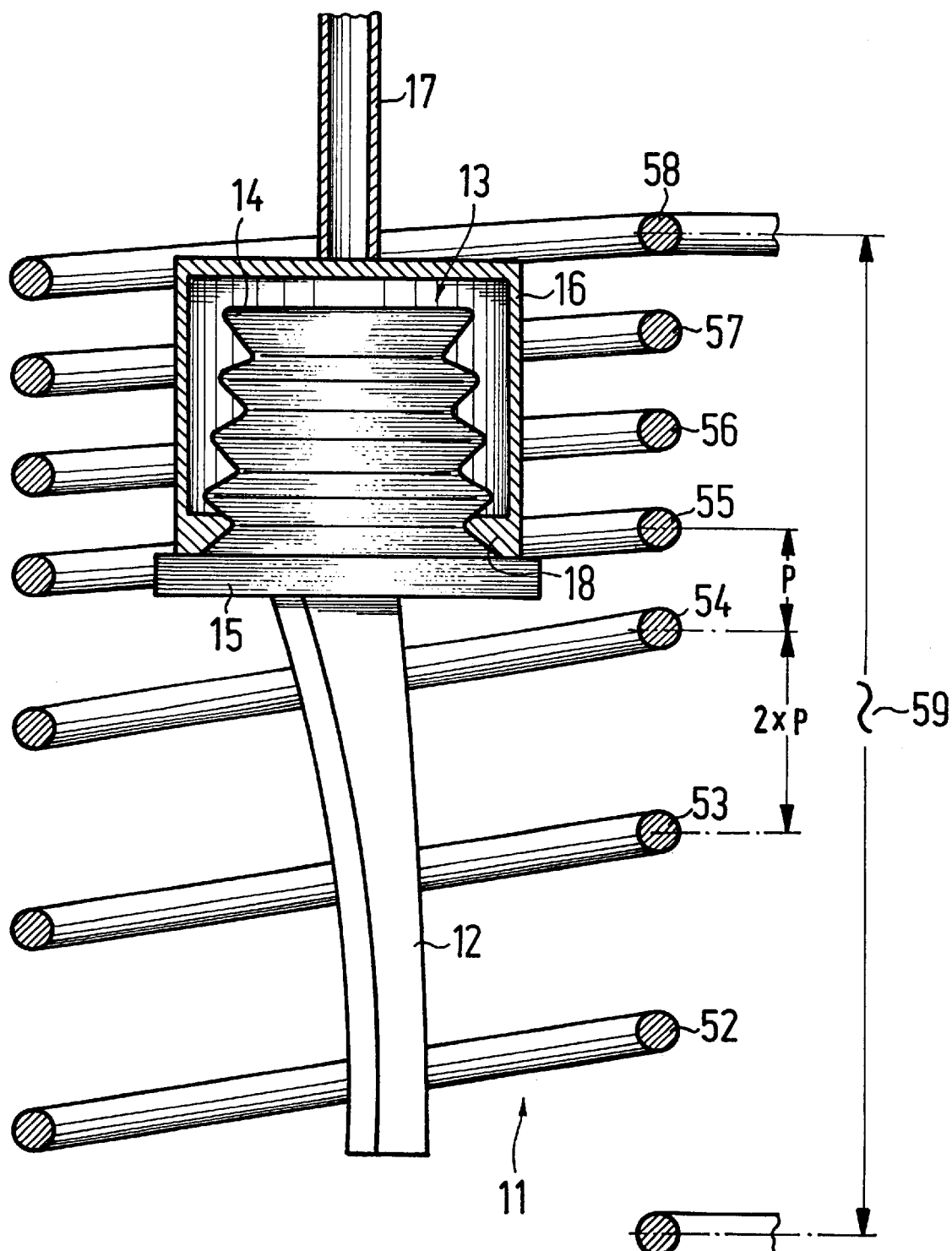
Figure 13:
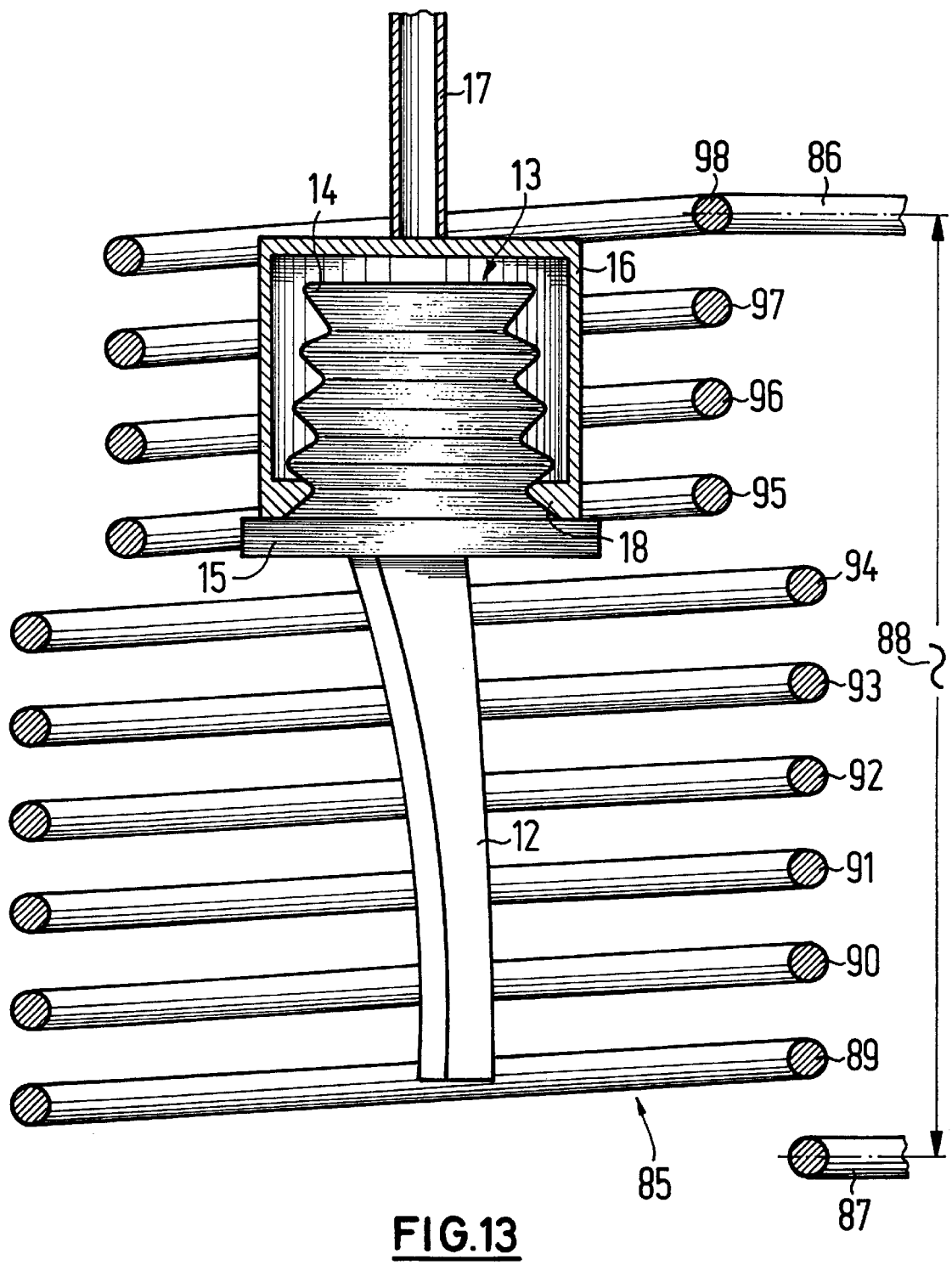
Figure 14:
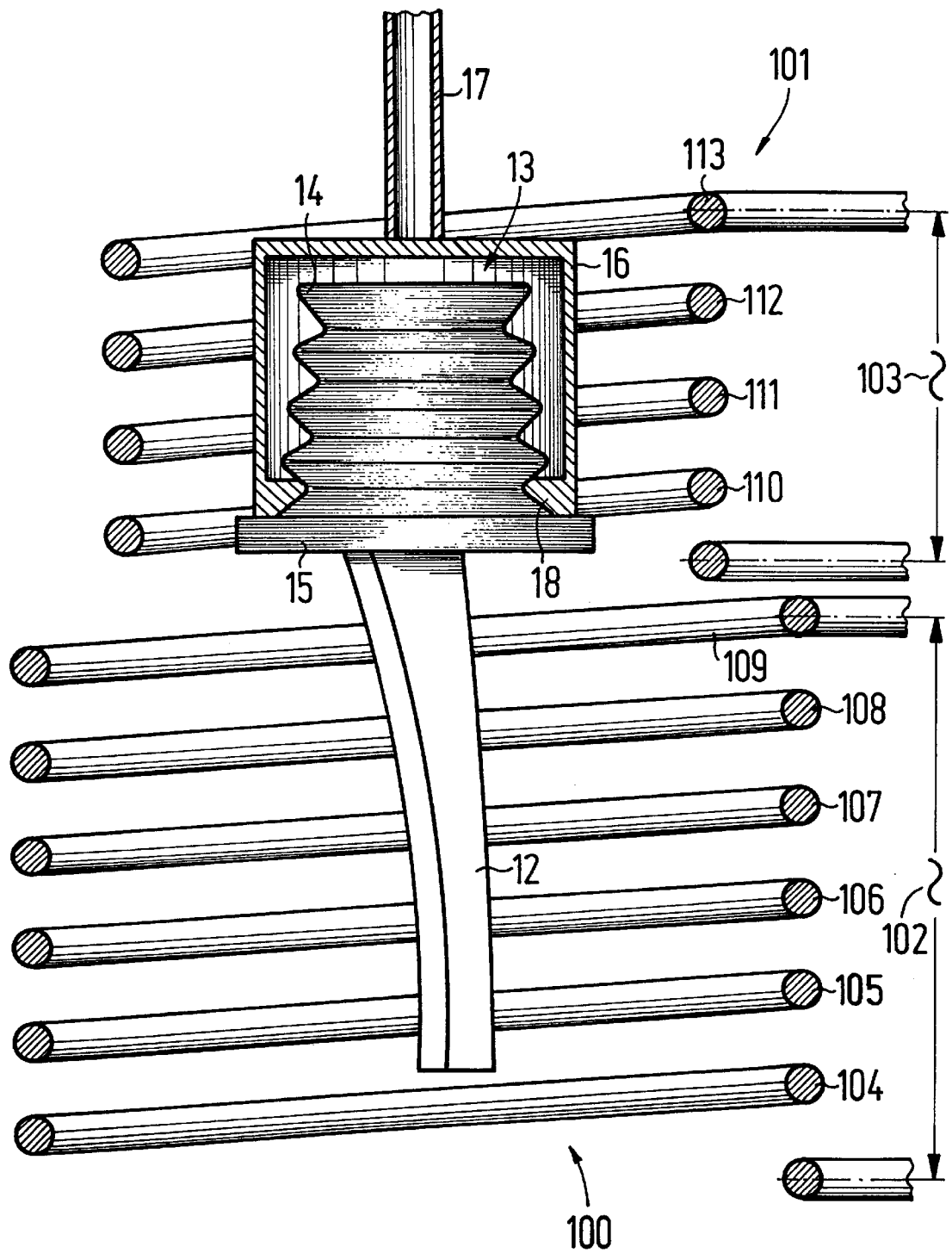

FIG. 3 the turbine blade represented in FIGS. 1 and 2 with a mounting for working procedures;

FIG. 4 the mounting of FIG. 3 without a turbine blade and rotated 90 degrees;

FIG. 5 a view A—A of the turbine blade, according to FIG. 3;

FIG. 6 a view B of the mounting of the turbine blade;

FIG. 7 a schematic representation of a first variant of the heating system according to the invention;

FIG. 8 a schematic representation of a second variant of the heating system according to the invention;

FIG. 9 a perspective view of a coating apparatus in which a heating system according to the invention is contained;

FIG. 10 a top view of the coating apparatus represented in FIG. 3;

FIG. 11 a cross section through the coating apparatus represented in FIG. 4;

FIG. 12 an induction heating system for a turbine blade, wherein the induction coil has different pitches;

FIG. 13 an inductive heating system for a turbine blade, in which the induction coil is divided into two areas, each of different diameters;

FIG. 14 an inductive heating system for a turbine blade, in which two separate coils are provided, which have the same pitch but different diameters.

In FIG. 1 a portion of a turbine blade 115 is represented, which has a wing 116 and a base 117. The blade base 117 is provided with holding means by which it can be fastened to a turbine shaft, not shown. These holding means are, among other things, teeth 118, 119 and 120 machined with great precision, and abutments 121, 122. The abutments 121 and 122 are part of a frame 123 which is slightly elevated above a central area 124, i.e., the surface 124 is a kind of recess.

125 and 126 identify raised portions which likewise serve for mounting or locking.

The turbine blade has an irregular surface, which makes it difficult to heat by conventional means. Variants of the turbine blades represented in FIGS. 1 and 2 are represented in FIGS. 1 and 2 of U.S. Pat. No. 5,106,266 (Borns et al.).

FIG. 2 shows the same turbine blade 115 as FIG. 1, but in a position rotated 90 degrees from the position of FIG. 1 about the longitudinal axis of the turbine blade. An abutment 122 can be seen, as well as the raised portions 126 and 39, raised portion 39 being opposite raised portion 126.

Since the blade base 117 is precision-machined, it must not be coated, so as to prevent later fitting problems. The subject of the coating is thus only the blade's wing 116, which is shown only partially.

In FIG. 3 the turbine blade 115 is shown together with a mounting 127 which is attached only for the purpose of treatment, e.g., the heating of turbine blade 115 and turbine base 117. The turbine blade 115 here assumes the same position as in FIG. 2. The blade base 117 is not visible in FIG. 3, because it is surrounded by a box or supporting box 128. This box 128 is provided in order to protect the blade base 117 against damage and the depositing of vapor.

Of the four walls of this box 128 three can be seen in FIG. 3: an upper floor 128, a bottom floor 130 and a side wall 131. The two floors 129 and 130 merge with tongues 132, 133, which are at right angles to these floors 129, 130 and are fastened by screws 134, 135 and nuts 136 to 139 to a disk 140. This disk is in turn joined to a first tube 141 which is connected to a second tube 142. Fastened to the first tube 141 is a sleeve 143 which is open toward the second tube 142. 144 and 145 identify holding strips which lie on a shaft 146.

In FIG. 4 the mounting 127 is shown without the turbine blade 115, and it is rotated 90 degrees about the longitudinal axis in comparison to FIG. 3. The holding strip 144 is removed, so that only the lower holding strip 145 is seen.

FIG. 5 shows a view "A" according to FIG. 3 of the turbine blade 115 and its mounting. The two holding strips 144, 145 are provided at their ends with through-bores 150 to 153 through which they can be joined together, for example by putting rods through the holes 151 and 153, and 150 and 152, respectively, and locking them at their ends.

The same view of the mounting 125 as in FIG. 5 is shown also in FIG. 6, but without the turbine blade 115 and without holding strip 144. Holding elements 154, 155, 156 and rube 141 can be seen in this view.

In FIG. 7 a heating chamber 1 is represented schematically and has an external housing 2 and a thermal insulating layer 3. The thermal insulating layer 3 can be made in the form of a pack of steel plates or graphite felt for operation in a vacuum, and for operation in normal atmosphere it can be a ceramic fiber insulation. In the interior of the heating chamber 1 is an induction coil 4 which surrounds the turbine wing 116 and the blade base 117 in box 128. A double arrow 8 indicates that the turbine blade 115 can be moved into the heating chamber and out again. It is connected to the closing flap 47 of the heating chamber 1.

If an alternating current flows through the induction coil 4, induction currents or eddy currents are produced in the turbine wing 116, in the box 128 and in the blade base 117 situated in the box 128, leading to the heating of these components. Eddy currents occur, of course, whenever a conductive body is penetrated by an alternating magnetic field. Eddy currents are themselves alternating currents which flow in closed lines of flow.

On account of the heat produced in the induction coil 4 on account of the above-mentioned components it operates as an induction furnace. In the case of induction furnaces a distinction is made between low-frequency induction furnaces (approx. 1–50 Hz), medium frequency induction furnaces (approx. 200 Hz–20,000 Hz) and high-frequency induction furnaces (>20,000 Hz). In the present case the frequencies are between 50 Hz and 100 kHz. The induction coil 4 is shown in FIG. 7 with a linear shape, it is adapted in a preferred embodiment to the contours of the turbine blade 115, as will be described further below.

An important part is played in inductive heating by the specific thermal conduction, i.e., the power that is converted per unit volume of, for example, a cylinder. The formula for this in a cylinder is:

$$\frac{P}{V} = \frac{P_1 A}{V} = P_1 \frac{2r_o \pi l}{r_o^2 \pi l} = \frac{2}{r_o} P_1$$

wherein $r_o$=radius of a cylinder and $$P_1 = \frac{N^2 I_e^2 K}{2\gamma} \operatorname{Re} \frac{(j-1)J_1(pr_o)}{J_0(pr_o)}$$

wherein

N=turns of winding per unit length $I_0$=excitation current

γ=specific conductivity

K=reciprocal depth of penetration $J_0$=Bessel function of zero order $J_1$=Bessel function of first order P=√-jωμγ

(see K. Simonyi: Theoretische Elektrotechnik, Berlin 1956, pp 303–305)

From this it can be seen that the alternating current frequency at which the specific thermal power per unit volume reaches a maximum depends on the electrical conductivity of the material.

For heating the turbine buckets 115 an alternating current frequency is accordingly chosen which gives the greatest heating effect. This AC frequency can easily be determined by experiment. Preferred are AC frequencies between 50 Hz and 2000 Hz.

In the area of the blade foot 117 of the turbine blade 115 is the previously mentioned mounting in the form of a box 128 surrounding the base 117. With this box 128 the turbine blade 115 is held and moved according to a given program, which is indicated by the double arrow 8. The box 128 serving as the mounting also has, as previously mentioned, the purpose of protecting the base area against vapor deposition. This, however, also impairs the action of heat on the base.

The depth of penetration with inductive heating can be controlled so that the box 128 consumes far less eddy current energy than the bucket base 117.

The calculation of the power distribution in the blade wing 116 on the one hand and in the blade base 117 or in the box 128 surrounding the base on the other hand can be performed only approximately and by simplifying assumptions.

If one simplifies and assumes that the blade wing 116, the blade base 117 and the box 128 are configured as hollow cylinders, the result will be, under conditions stated below:

| | |
|---|---|
| Material of the blade wing 116, blade base 117 and box 128 | Nickel-based alloy (ρ = 5 × 10⁻⁷ Ωm, $\mu_r$ = 1.1) |
| Wall thickness of blade wing 116 | 6 mm |
| Inside diameter of blade wing 116 | 34 mm |

-continued

| Material of the blade wing 116, blade base 117 and box 128 | Nickel-based alloy ($\rho = 5 \times 10^{-7}$ $\Omega$m, $\mu_r = 1.1$) |
|---|---|
| Length of blade wing 116 | 320 mm |
| Wall thickness of blade base 117 | 60 mm |
| Length of blade base 117 | 180 mm |
| Wall thickness of box 128 | 2 mm |

Coil with 6 turns as induced power in the individual components following power distributions:

| | Total | Box 128 | Blade base 117 | Blade wing 116 |
|---|---|---|---|---|
| Power (100 Hz, 50 V, 41 kA) | ~210 kW | ~15 kW | ~60 kW | ~13 kW |
| Power (800 Hz, 150 V, 18 kA) | ~230 kW | ~47 kW | ~47 kW | ~56 kW |
| Power (2000 Hz, 250 V, 13 kA) | ~200 kW | ~73 kW | ~29 kW | ~42 kW |

At the low frequency of 100 Hz the power induced in box 128 thus amounts to one-quarter of the power induced in the blade base 117, although the depth of penetration in the case of a nickel-based alloy is rather great at 100 Hz, namely about 35 mm.

The depth of penetration $\delta$ is defined by $\delta = 1/\sqrt{\pi f \sigma \mu}$, f being the frequency, $\mu$ the magnetic permeability and $\sigma$ the specific electrical conductivity. Some examples of the of penetration are to be found in the following table.

| f/Hz | Copper | $\delta$/mm aluminum | iron $\mu_r = 200$ |
|---|---|---|---|
| 50 | 9.44 | 12.3 | 1.8 |
| $10^2$ | 6.67 | 8.7 | 1.3 |
| $10^3$ | 2.11 | 2.75 | 0.41 |
| $10^4$ | 0.667 | 0.87 | 0.13 |

Also by means of alternative model computations it was found that the ratio of the power induced in box 128 to the power induced in the blade base 116 increases with increasing frequency.

At a frequency of about 800 Hz approximately the same power is induced in the box 128 as in the blade base 116. At still higher frequencies more power is induced in box 128 than in the blade base.

The ratio between the power induced in the blade base 116 and the power induced in the blade wing 117 varies somewhat similarly, although the power induced in the blade wing 117 again decreases at high frequency, but in the simplified model in any case.

On account of the lower mass of the box 128 in comparison with the blade base 116, the box 128 is heated faster at a frequency above 800 Hz than the blade base. The same applies also to the blade wing 117. On account of the temperature limit at the blade wing 117 and at the box 128 the heating process cannot result in a marked abbreviation of the heating time in comparison to conventional heating processes using resistance heating (radiant heat).

For high frequencies the box 128 can be slotted in order to reduce the eddy currents and thus the powers induced in box 128. The box 128 can also be made of narrow sheet metal.

A slotted box 128 can reduce the power reduced in it, but the power induced in the blade wing 116 remains unchanged, i.e., at high frequencies excessively fast heating of the blade wing 116 cannot be avoided. Since the blade base is not to be coated, warming the blade base is unnecessary. The blade base 117 must therefore, however, be heated together with the blade wing 116 so as not to draw the heat from it on account of its great mass.

If two coils are used instead of one coil, as will be described below in connection with FIGS. 12 and 13, the heating of the blade base 117 and blade wing 116 can be performed separately with different frequencies. Considering the radiation losses on the box 128 and at the blade base 117, a relatively uniform heating of box 128, blade base 117 and blade wing 116 can be achieved at a frequency of <800 Hz (e.g. 100 Hz), thereby shortening the overall heating time. Of course, in this case a relatively great power loss occurs in coil 4.

In FIG. 8 there is shown a variant of the invention, in which a graphite tube 9 is arranged between the turbine blade 115 and the thermal insulation 3. The heating chamber 2 is relatively greater than in FIG. 7, while the thermal insulation 3 has been left the same. The graphite tube 9 can be shifted horizontally by an appropriate device, as indicated by the double arrow 10. In this way it is possible to heat the turbine blade 115 initially without using the graphite tube 9—if the latter is not shifted to the light—and then by using the graphite tube 9—if it is not shifted leftward again over the turbine blade 115—to achieve a temperature uniformly distributed over the turbine blade. The turbine blade 115 can also be introduced only partially into the graphite tube 9 serving as susceptor. In this manner the base 117 of the turbine blade 115 is heated inductively and the blade wing 116 by the thermal radiation from the susceptor 9.

In a special variant of the embodiment shown in FIG. 8, the susceptor 9, which consists of graphite or other suitable material and is closed at one end by a thermal insulating plate 19, can also permanently surround the turbine blade 115 and nevertheless be switched between rapid heating and constant heating. In this case the frequency of the alternating current flowing through the induction coil 4 is changed from a first frequency to a second frequency. In the first frequency the field reaches to a certain extent through the susceptor 9 without greatly heating the latter, only the turbine blade 115 being heated, while at the second frequency substantially only the graphite tube 9 is heated. With the induction coil 4 not only can one component, for example one turbine blade, can be heated, but it is also possible to heat a second turbine blade or even more turbine blades.

The graphite tube 9 is represented in FIG. 8 only by way of example. It is important that the workpiece—here the turbine blade 115—is surrounded by an electrically conductive component so that the inductive heating can be kept away from the turbine blade.

The graphite tube 9 can also be used for the purpose of covering the blade wing 116 and leaving the blade base 117 free, so that the blade wing 116 is heated indirectly through the heated graphite tube 9 by radiant heating and convection, while the blade base 117 is directly heated by eddy currents. Any other suitable material can be used instead of graphite for the tube 9.

As it can be seen from the model calculation described in connection with FIG. 7, the ratio of the inductive eddy current power released in the blade base 117 in proportion to the inductive eddy current power released in the box 128 varies with the frequency. If the frequency is reduced, the percentage of the power released in the blade base 117 is relatively greater.

By varying the frequency, consequently, the power ratio can be varies. In the case of the variant according to FIG. 8, this signifies that, by varying the frequency of the alternating current, the greater power is released once in the susceptor 9 and once in the blade wing 116. So to a certain extent it is possible to switch from a mainly inductive heating of the blade wing 116—if a low frequency is selected—to a mainly radiation heating—if a high frequency is selected.

In FIG. 9 there is shown a coating apparatus 20 which contains an inductive heating system according to FIGS. 7 and 8. Such a coating apparatus is disclosed in similar form in DE 197 15 245 A1 and DE 198 19 726 A1. This coating apparatus 20 is a so-called "cluster coater," which is a modular system in which different process modules can be arranged in any desired manner on a central processing or "treatment chamber" 21. A processing chamber 21 of octagonal cross section, which rests on several supports of which only two supports 22, 23, are seen in FIG. 9, has on its top side several supporting rails 24, 25; 26, 27, on which several devices are mounted. The two rails 24, 25, running parallel to one another bear, for example, a heating chamber 51 according to the invention, a vacuum pump 28 being situated beside this heating chamber 51. These heating chambers correspond functionally to the heating chamber 1 of FIG. 1 or 2. Offset 90 degrees from the heating chamber is a pretreatment or post-treatment chamber 46. Again 90 degrees offset from the pretreatment or post-treatment chamber 46 is a loading and unloading chamber 33 whose door is shown in the open state. Between the pretreatment and post-treatment chamber 46 and the loading and unloading chamber 33 a vacuum pump 44 is provided, which is flange-mounted directly on the processing chamber 21.

Opposite the post-treatment chamber 46 and 90 degrees offset from the heating chamber 51 is a coating chamber 38 on which an electron beam gun 29 is flange-mounted. Also, a vacuum pump 42 is arranged on this coating chamber 38. By means of the electron beam chamber, a coating is performed, for example, by the EB/DVD (=Electron Beam Directional Vapor Deposition) method. It is also possible, however, to perform the coating by means of an EB/PVD (=Electron Beam Physical Vapor Deposition) method.

An operator 36 sits on a chair 37 in front of the coating chamber 38 and looks through a viewing window 35 into the coating chamber. Beside the operator 36 two monitors 31, 32, are provided, which are fastened to the supporting rails 27, 26.

Operation of the coating apparatus 20 shown in FIG. 9 can be performed, for example, by first loading a workpiece through an airlock into the loading and unloading chamber 33 and then it is moved to the heating chamber 51 where inductive heating takes place. How this inductive heating is performed has been described in connection with FIGS. 1 to 8. After the heating process the workpiece is brought into the coating chamber 38 where coating is performed. After coating the workpiece is brought into the post-treatment chamber. This post-treatment can likewise be performed inductively. Then the workpiece thus treated is brought out through the loading and unloading chamber 33, which can be provided with a rapid cooling system.

In the method of operation described above, the workpiece is not fed through the individual chambers clockwise or counterclockwise. It is evident, however, that if the individual chambers are arranged accordingly it is possible, and even practical, for the workpiece to be treated clockwise or counterclockwise.

The same coating apparatus 20 as in FIG. 9 is again shown in FIG. 10, in a top view. In this drawing the operator 36 has left the chair and has just opened or closed the door 34 of the loading or unloading chamber 33.

It is characteristic of the coating apparatus 20 that it functions as an in-line system without occupying the space required by an in-line system. Thus, workpieces such as turbine blades can be subjected successively to various treatments. These various treatments take place in the various chambers 33, 38, 51 and 46. The processing chamber 21 in that case serves the purpose of bringing the workpieces automatically into the particular chambers and taking them out again. It is important that a turning mechanism be provided in the processing chamber to rotate the workpieces so that they pass from one chamber to another chamber. The rotating mechanism is driven through the shaft 50 shown in FIG. 9 by a motor 49.

In FIG. 11 there is shown in cross section a variant of the coating apparatus shown in FIG. 10. This coating apparatus 60 again has a processing chamber 61 on which a heating chamber 62 with a vacuum pump 63 is flange-mounted. In addition to the heating chamber 62 a loading and unloading chamber 64, a pretreatment and post-treatment chamber 65 and a coating chamber 66 are flange-mounted on the processing chamber 61. A vacuum pump 67 is connected to the coating chamber 66 and can evacuate it.

With the door 69 opened, a turbine blade 6 is placed by an operator 70 into the loading and unloading chamber 64 and is joined to a mechanism 71 of the pivot mounting 73, this mechanism 71 being able to be moved up to the loading and unloading chamber 64 and moved away from it again, which is indicated by the arrow 72. From its position in the chamber 64 the turbine blade 6 can now be subjected automatically to different operations. For this purpose it is brought inward by the mechanism 71 in the processing chamber 61 in the direction of the arrow 72, whereupon a pivot mounting 73 rotating in the direction of an arrow 74 is brought to a position 75 opposite the pretreatment chamber 65. From there the turbine blade is carried by the mechanism 71 into the pretreatment and post-treatment chamber 65. Then the turbine blade 6 is again removed from chamber 65 and, after another 90° turn of the pivot mounting 73 it is brought clockwise into position 76 which is opposite the chamber 62.

Now the turbine blade is pushed by mechanism 71 into heating chamber 62. This heating chamber corresponds substantially to chamber 2 in FIG. 8. After inductive heating is performed the turbine blade 6 passes with another 90-degree rotation of the pivot mounting 73 and a linear movement of mechanism 71 into coating chamber 66 where the turbine blade is coated by means of an electron beam gun 80. The coating process can be observed by an operator 81 through a window 82. This window 82 is part of an appendage 83 connected to a door 84. After the turbine blade 6 is coated it can be removed from the coating chamber 66 by opening the door 84.

In FIG. 11 the door and appendage are identified in the open state by 84' and 83', respectively.

It is apparent that during the time in which the described turbine blade passes through the different processing stations, another three turbine blades can be processed which are spaced 90 degrees apart from one another. Each of these turbine blades is then in a different processing station.

In FIG. 12 there is shown an induction coil 11 whose windings have different pitches. Three windings 52, 53, 54, have a relatively great pitch, while four other windings 55, 56, 57, 58 have a relatively small pitch. The windings with the great pitch surround a blade leaf 12, while windings 55, 56, 57 with the relatively small pitch surround a blade base 13. The blade base 13 in this example consists of a part provided with a thread 14 and a flange 15 adjoined by the blade leaf 12.

A support which consists of a cylindrical metal sleeve 16 and a stem 17 is coupled with the blade base 13. Functionally, this metal sleeve 16 corresponds to box 128 in FIGS. 3 to 8. The metal sleeve 16 has at its open end a ring-shaped and inwardly reaching projection 18 which engages the thread 14 of the blade base 13.

59 identifies an alternating current source which is connected to the two windings of the induction coil 11, i.e., the windings 52 to 54 and 55 to 58 of the induction coil 11 are connected in series.

FIG. 13 shows the same turbine blade as FIG. 12. The induction coil 85 in this case is a single object but has coil portions which have the same pitch but different diameters. The induction coil 85 is connected by its ends 86, 87 to an alternating current source 88. Six visible windings 89 to 94 have a relatively great diameter at a given pitch, while four other visible windings 95 to 98 have a smaller diameter with a uniform pitch.

Another variant of the induction coil is shown in FIG. 14. In this embodiment the turbine blade is again the same as in the two previous figures. The coil, however, is divided into two individual coils 100 and 101 which are connected to two separate alternating current sources 102 and 103. The windings 104 to 109 of individual coil 100 have the same pitch as windings 10 to 113 of the other coil 101, but they have a different diameter. The diameter of windings 104 to 109 is greater than that of windings 10 to 113, so that the base 13 of the turbine blade is more greatly heated than the blade leaf 12.

As described above, the heating of the turbine blade serves to enable the blade leaf to be provided with a protective coating, for example a ceramic coating.

Before the heating is performed, the blade can be subjected to a deep-freeze process to improve its life. As experiments by Robert Brunson (DER SPIEGEL, 40/2000, p. 259) have shown, metal parts which, depending on the material, are first subjected to cold shocks between minus 110 and minus 200 degrees Celsius and then are heated to 80 to 600 degrees, have an especially long life. After the procedure, which probably rearranges the molecular structure of the material, the workpieces not only lasted longer but were also less liable to crazing. The brake blocks for rotors of jet engine had an increase in useful life of almost 200 percent. Deep-chilled titanium drills achieved twice the drilling performance of conventional products.

What is claimed is:

1. An apparatus comprising:
   a heating chamber, said heating chamber comprising an external housing, a thermal insulating layer, and a closing flap;
   at least one induction coil in said heating chamber which at least partially surrounds a workpiece; wherein said at least one induction coil is connected to an alternating current source that is adjustable to at least a first frequency for inductively heating a first area of a workpiece and a second frequency for inductively heating a second area of a workpiece.

2. An apparatus according to claim 1, wherein the first frequency produces a maximum heating of the workpiece and the second frequency produces a maximum inductive heating of the susceptor.

3. The apparatus of claim 2, wherein said at least one heating coil has at least two different diameters.

4. An apparatus according to claim 1, wherein the induction coil has areas with different winding pitches.

5. The apparatus of claim 4, wherein said at least one heating coil has at least two different diameters.

6. An apparatus according to claim 1, wherein the induction coil has areas with different winding diameters.

7. An apparatus according to claim 6, wherein a plurality of induction coils are provided, each of which is connected to its own alternating current source.

8. The apparatus of claim 6, wherein said at least one heating coil has at least two different winding pitches.

9. The apparatus of claim 1, wherein said induction coil is heated and has a frequency of 50 $H_2$ to 100 $kH_2$.

10. The apparatus of claim 9, wherein said at least one heating coil has at least two different winding pitches.

11. The apparatus of claim 1, comprising at least a second heating coil, wherein said first heating coil has a different winding pitch than the second heating coil.

12. The apparatus of claim 1, wherein said first coil has at least two different winding pitches.

13. The apparatus of claim 12, wherein said second heating coil has an alternating current source that is different than the alternating current source supplying said first heating coil.

14. An apparatus comprising:
   a heating chamber, said heating chamber comprising an external housing, a thermal insulating layer, and a closing flap; and
   at least one induction coil being provided which partially surrounds a work piece and which is connected to an alternating current source; and
   a susceptor positioned so that a workpiece may be positioned so that said susceptor is between a workpiece and said induction coil wherein the susceptor is displaceable relative to a workpiece by means for displacing said susceptor relative to a workpiece so that a portion of the workpiece is positioned directly opposite the induction coil, while another portion shielded from the induction coil.

15. An apparatus according to claim 14, wherein the susceptor is a tube.

16. The apparatus of claim 15, comprising at least a second heating coil, wherein said first and said second heating coil have different winding pitches.

17. The apparatus of claim 16, wherein said second heating coil has an alternating current source that is different than the alternating current source supplying said first heating coil.

18. An apparatus according to claim 14, wherein the alternating current source is adjustable to at least two different frequencies, the first frequency producing a maximum inductive heating of the blade base and the second frequency a maximum inductive heating of the susceptor.

19. The apparatus of claim 18, comprising at least a second heating coil, wherein said first and said second heating coil have different winding pitches.

20. The apparatus of claim 19, wherein said second heating coil has an alternating current source that is different than the alternating current source supplying said first heating coil.

21. The apparatus of claim 14, wherein said susceptor comprises a tube closed at one end by a thermal plate and said means for displacing said susceptor is mounted to said thermal plate.

22. The apparatus of claim 14, wherein said susceptor comprises graphite.

23. The apparatus of claim 14, wherein said tube comprises graphite.

24. The apparatus of claim 14, comprising at least a second heating coil, wherein said first heating coil has a different winding pitch than the second heating coil.

25. The apparatus of claim 24, wherein said second heating coil has an alternating current source that is different than the alternating current source supplying said first heating coil.

26. The apparatus of claim 14, wherein said first coil has at least two different winding pitches.

* * * * *